United States Patent [19]

Gutierrez et al.

[11] Patent Number: 5,043,084

[45] Date of Patent: Aug. 27, 1991

[54] NOVEL POLYMER SUBSTITUTED AMINO PHENOL MANNICH BASE AMIDO-AMINE DISPERSANT ADDITIVES (PT-742)

[75] Inventors: Antonio Gutierrez, Mercerville; Robert D. Lundberg, Bridgewater, both of N.J.

[73] Assignee: Exxon Chemical Patents, Inc., Linden, N.J.

[21] Appl. No.: 358,778

[22] Filed: May 30, 1989

Related U.S. Application Data

[60] Continuation-in-part of Ser. No. 269,461, Nov. 10, 1988, Pat. No. 4,956,107, Ser. No. 126,405, Nov. 30, 1987, Pat. No. 4,857,217, and Ser. No. 294,521, Jan. 9, 1989, Pat. No. 4,971,711, which is a division of Ser. No. 77,713, Jul. 24, 1987, Pat. No. 4,820,432, said Ser. No. 269,461, is a continuation-in-part of Ser. No. 126,405.

[51] Int. Cl.$^5$ .................. C10M 129/10; C10M 133/16
[52] U.S. Cl. ............................... 252/47; 252/51.5 A; 564/305
[58] Field of Search ............... 252/47, 47.5, 51.5 R, 252/51.5 A, 351, 356, 357; 564/305

[56] References Cited

U.S. PATENT DOCUMENTS

| | | | |
|---|---|---|---|
| 2,921,085 | 1/1960 | Schramm | 260/458 |
| 3,247,163 | 4/1966 | Reinking | 260/47 |
| 3,337,609 | 8/1967 | Williamson et al. | 260/482 |
| 3,340,190 | 9/1967 | Deluga | 252/33.4 |
| 3,385,791 | 5/1968 | Colyer | 252/32.7 |
| 3,417,140 | 12/1968 | McWhorter et al. | 260/561 |
| 3,442,808 | 5/1969 | Traise et al. | 252/49.6 |
| 3,445,441 | 5/1969 | Rushton | 260/89.5 |
| 3,449,362 | 6/1969 | Lee | 260/326.3 |
| 3,458,495 | 7/1969 | Younghouse et al. | 260/136 |
| 3,491,025 | 1/1970 | Lee | 252/49.6 |
| 3,509,047 | 4/1970 | Rushton | 210/54 |
| 3,514,250 | 5/1970 | Rushton | 21/2.5 |
| 3,528,928 | 9/1970 | Rushton | 252/341 |
| 3,630,902 | 12/1971 | Coupland et al. | 252/51.5 A |
| 3,873,460 | 3/1975 | Coon | 252/51.5 A |
| 3,897,456 | 7/1975 | Brewster | 260/340.2 |
| 3,903,003 | 9/1975 | Murphy et al. | 252/51.5 A |
| 4,159,957 | 7/1979 | deVries | 252/33.4 |
| 4,354,950 | 10/1982 | Hammond et al. | 252/51.5 A |
| 4,459,241 | 7/1984 | Wilson et al. | 260/502.5 E |
| 4,493,771 | 1/1985 | Wilson et al. | 210/700 |
| 4,547,562 | 10/1985 | Nichols | 528/119 |
| 4,668,834 | 5/1987 | Rim et al. | 585/12 |
| 4,675,374 | 6/1987 | Nichols | 528/119 |
| 4,713,189 | 12/1987 | Nalesnik | 252/51.5 A |

FOREIGN PATENT DOCUMENTS 8706228 10/1987 PCT Int'l Appl.

*Primary Examiner*—Jacqueline V. Howard
*Attorney, Agent, or Firm*—J. B. Murray, Jr.

[57] ABSTRACT

The present invention is directed to oil-soluble lubricating oil additives comprising Mannich Base condensates of (A) a polymer substituted mono- or dicarboxylic acid material, (B) an optionally alkyl-substituted N-hydroxyaryl compound, (C) an aldehyde, and (D) an amido-amine or thioamido-amine wherein the polymer moiety of the mono- or dicarboxylic acid material is derived from a polymer of 300 to 10,000 number average molecular weight, and wherein the amido-amine and thioamido-amine reactants are derived by reacting polyamines and alpha, beta-unsaturated compounds. The Mannich Base condensates of this invention are useful as dispersants.

42 Claims, No Drawings

NOVEL POLYMER SUBSTITUTED AMINO PHENOL MANNICH BASE AMIDO-AMINE DISPERSANT ADDITIVES (PT-742)

CROSS-REFERENCE TO RELATED APPLICATIONS

This application is a continuation-in-part of co-pending U.S. Ser. No. 269,461, filed Nov. 10, 1988, now U.S. Pat. No. 4,956,107, Ser. No. 126,405, filed Nov. 30, 1987 now U.S. Pat. No. 4,857,217 and Ser. No. 294,521, filed Jan. 9, 1989, now U.S. Pat. No. 4,971,711 which is a divisional application of Ser. No. 77,713, filed July 24, 1987, now U.S. Pat. No. 4,820,432. Ser. No. 269,461 is a continuation-in-part of Ser. No. 126,405.

FIELD OF THE INVENTION

This invention relates to improved oil soluble dispersant additives useful in oleaginous compositions, including fuel and lubricating oil compositions, and to concentrates containing said additives.

BACKGROUND OF THE INVENTION

U.S. Pat. No. 3,442,808 relates to lubricating oil additives prepared by reacting alkenyl succinic anhydride with the Mannich condensation product prepared by condensing alkyl substituted phenol, formaldehyde and polyalkylene polyamine.

U.S. Pat. No. 3,458,495 relates to oxidation inhibitors and dispersant-detergent oil additives comprising the reaction product of one equivalent of a phosphosulfurized hydrocarbon and about 0.5 to 4 equivalents of an alkylene amino phenol. The phosphosulfurized hydrocarbons are prepared by reacting a terpene, a petroleum fraction or a 500 to 200,000 molecular weight $C_2$ to $C_6$ olefin polymer (including polymers of ethylene, propylene, butylene, isobutylene or isoamylene) and from 5 to 40 wt % of a sulfide of phosphorus. The alkylene amino phenol is prepared by a Mannich Base condensation of aldehyde, alkylene polyamine and alkyl phenol.

U.S. Pat. No. 4,354,950 discloses a method of preparing Mannich base derivatives of hydroxyaryl succinimides of the formula:

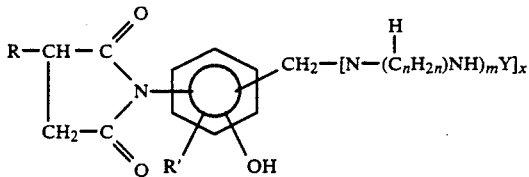

wherein R is hydrocarbyl of 25 to 200 carbon atoms, R' is H, alkyl or halogen, "n" is 2 or 3, "m" has a value of 1 to 5, Y is H or a methylene hydroxyaryl succinimide radical, "x" has a value of 1 to 2 when Y is H and a value of 1 when Y is a methylene hydroxyaryl succinimide radical. The above succinimides are formed in a stepwise reaction, e.g., by reacting a polyalkenyl succinic anhydride with an aminophenol, to produce an intermediate N-(hydroxyaryl) hydrocarbyl succinimide, which is then reacted with an alkylene diamine and an aldehyde (e.g., formaldehyde) in a Mannich base reaction to produce the described succinimides. The described succinimides may be added to a base oil of lubricating viscosity to form lubricant concentrates and lubricating oil formulations.

U.S. Pat. No. 4,668,834 to Uniroyal Chemical discloses preparation and composition of ethylene-alpha olefin copolymers and terpolymers, which are disclosed to be useful as intermediates in epoxy-grafted encapsulation compositions.

SUMMARY OF THE INVENTION

In accordance with one aspect of the present invention, there are provided novel adducts formed by contacting under reaction conditions (A) at least one polymer substituted mono- or dicarboxylic acid material, (B) at least one N-hydroxyaryl amine, which can be optionally alkyl-substituted, (C) at least one aldehyde reactant, and (D) at least one amido-amine (or thioamido-amine) reactant, wherein the polymer substituent in the mono- or dicarboxylic acid material is derived from a polymer having a 300 to 10,000 number average molecular weight, and wherein the amido-amine or thioamido-amine reactant comprises the reaction product of at least one polyamine and an alpha, beta-ethylenically unsaturated compound.

In accordance with other aspects of the present invention, an oil-soluble lubricating oil additive is provided by a process which comprises (a) forming a Mannich Base condensate intermediate by reacting (B) an optionally alkyl-substituted N-hydroxyaryl amine with (C) at least one aldehyde reactant (e.g., formaldehyde) and (D) an amido-amine (or thioamido-amine), and thereafter (b) contacting the Mannich Base intermediate with (A) at least one polymer substituted mono- or dicarboxylic acid material, wherein the polymer substituent is derived from an a polymer having a 300 to 10,000 number average molecular weight.

In accordance with yet other aspects of the present invention, an oil-soluble lubricating oil additive is provided by a process which comprises (a) contacting (A) at least one polymer substituted mono- or dicarboxylic acid material, wherein the polymer substituent is derived from a polymer having a 300 to 10,000 number average molecular weight, with (B) an optionally alkyl-substituted N-hydroxyaryl amine to form a polymer-substituted carbonyl-amino aromatic material, and (b) contacting said polymer-substituted carbonyl-amino aromatic material with (C) at least one aldehyde reactant (e.g., formaldehyde) and (D) an amido-amine (or thioamido-amine), to form the desired Mannich Base condensate dispersant material.

The materials of the invention are different from the prior art Mannich Base materials because of their effectiveness and their ability to provide enhanced lubricating oil dispersancy, as exhibited by their enhanced sludge and varnish control properties.

DETAILED DESCRIPTION OF THE INVENTION

Reactant A

The long chain hydrocarbyl polymer-substituted mono- or dicarboxylic acid material, i.e., acid, anhydride or acid ester used in this invention, includes the reaction product of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said mono unsaturation); (ii) derivatives of (i) such as anhydrides or $C_1$ to $C_5$ alcohol derived mono- or di-esters of (i); (iii) monounsaturated $C_3$ to $C_{10}$ monocarboxylic acid wherein the carbon-carbon double bond is conjugated to the carboxy group, i.e, of the structure

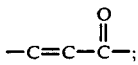

and (iv) derivatives of (iii) such as $C_1$ to $C_5$ alcohol derived monoesters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain non-acid substituted polymer. The polymer-substituted mono- or dicarboxylic acid material (also referred to herein as "functionalized" polymer or polyolefin), non-acid substituted polyolefin, and any other polymeric by-products, e.g. chlorinated polyolefin, (also referred to herein as "unfunctionalized" polymer) are collectively referred to herein as "product residue" or "product mixture". The non-acid substituted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e. increased or decreased by techniques known in the art, such modifications do not alter functionality as defined above. The terms "polymer substituted monocarboxylic acid material" and "polymer substituted dicarboxylic acid material" as used herein are intended to refer to the product mixture whether it has undergone such modification or not.

Accordingly, the functionality of the polymer substituted mono- and dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

Preferred olefin polymers for reaction with the monounsaturated carboxylic reactants to form reactant A are polymers comprising a major molar amount of $C_2$ to $C_{10}$, e.g. $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Mixtures of polymers prepared by polymerization of mixtures of isobutylene, butene-1 and butene-2, e.g., polyisobutylene wherein up to about 40% of the monomer units are derived from butene-1 and butene-2, is an exemplary, and preferred, olefin polymer. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene: or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used in the formation of reactant A will generally have number average molecular weights within the range of about 700 and about 5,000, preferably from about 900 to 4,000, more preferably between about 1300 and about 3,000. Particularly useful olefin polymers have number average molecular weights within the range of about 1500 and about 3000 with approximately one terminal double bond per polymer chain. An especially useful starting material for highly potent dispersant additives useful in accordance with this invention is polyisobutylene, wherein up to about 40% of the monomer units are derived from butene-1 and/or butene-2. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

The olefin polymers will generally have a molecular weight distribution (the ratio of the weight average molecular weight to number average molecular weight, i.e. $\overline{M}_w/\overline{M}_n$) of from about 1.0 to 4.5, and more typically from about 1.5 to 3.0.

The polymer can be reacted with the monounsaturated carboxylic reactant by a variety of methods. For example, the polymer can be first halogenated, chlorinated or brominated to about 1 to 8 wt. %, preferably 3 to 7 wt. % chlorine, or bromine, based on the weight of polymer, by passing the chlorine or bromine through the polymer at a temperature of 60° to 250° C., preferably 110° to 160° C., e.g. 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

Alternately, the polymer and the monounsaturated carboxylic reactant can be contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety.

Preferably, the polymers used in this invention contain less than 5 wt %, more preferably less than 2 wt %, and most preferably less than 1 wt % of a polymer fraction comprising polymer molecules having a molecular weight of less than about 300, as determined by high temperature gel premeation chromatography employing the corresponding polymer calibration curve. Such preferred polymers have been found to permit the preparation of reaction products, particularly when employing maleic anhydride as the unsaturated acid reactant, with decreased sediment. In the event the polymer produced as described above contains greater than about 5 wt % of such a low molecular weight polymer fraction, the polymer can be first treated by conventional means to remove the low molecular weight fraction to the desired level prior to initiating the ene reaction, and preferably prior to contacting the polymer with the selected unsaturated carboxylic reactant(s). For example, the polymer can be heated, preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as as the polymer number average molecular weight, the amount of the low molecular weight fraction to be removed, the particular monomers employed and other factors. Generally, a temperature of from about 60° to 100° C. and a pressure of from about 0.1 to 0.9 atmospheres and a time of from about 0.5 to 20 hours (e.g., 2 to 8 hours) will be sufficient.

In this process, the selected polymer and monounsaturated carboxylic reactant and halogen (e.g., chlorine gas), where employed, are contacted for a time and under conditions effective to form the desired polymer substituted mono- or dicarboxylic acid material. Generally, the polymer and monounsaturated carboxylic reactant will be contacted in a unsaturated carboxylic reactant to polymer mole ratio usually from about 0.7:1 to 4:1, and preferably from about 1:1 to 2:1, at an elevated temperature, generally from about 120° to 260° C., preferably from about 160° to 240° C. The mole ratio of halogen to monounsaturated carboxylic reactant charged will also vary and will generally range from about 0.5:1 to 4:1, and more typically from about 0.7:1 to 2:1 (e.g., from about 0.9 to 1.4:1). The reaction will be generally carried out, with stirring for a time of from about 1 to 20 hours, preferably from about 2 to 6 hours.

By the use of halogen, about 65 to 95 wt. % of the polyolefin, e.g. polyisobutylene will normally react with the monounsaturated carboxylic acid reactant. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of mono- or dicarboxylic acid producing units to polyolefin, e.g., 1.1 to 1.8, etc. are based upon the total amount of polyolefin, that is, the total of both the reacted and unreacted polyolefin, used to make the product.

The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

If desired, a catalyst or promoter for reaction of the olefin polymer and monounsaturated carboxylic reactant (whether the olefin polymer and monounsaturated carboxylic reactant are contacted in the presence or absence of halogen (e.g., chlorine)) can be employed in the reaction zone. Such catalyst of promoters include alkoxides of Ti, Zr, V and Al, and nickel salts (e.g., Ni acetoacetonate and Ni iodide) which catalysts or promoters will be generally employed in an amount of from about 1 to 5,000 ppm by weight, based on the mass of the reaction medium.

THE N-HYDROXYARYL AMINE MATERIAL

The N-hydroxyaryl amines employed in this invention can comprise any aromatic compound having at least one hydroxy group and at least one amine-containing group substituted on at least one ring of the aromatic compound. The N-hydroxyaryl amines which are preferred in this invention comprise N-hydroxyaryl mono-primary amines of the formula (I):

$$H_2N-Ar-OH$$

wherein Ar represents

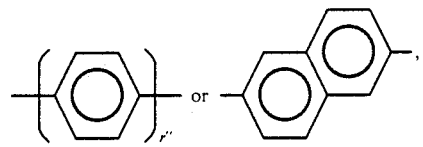

and wherein r″ is 1 or 2, and alkyl- and halide-substituted derivatives thereof, wherein from 1 to 3 ring carbon atoms are substituted by a hydrocarbyl group or halide atom. Illustrative of such Ar groups are

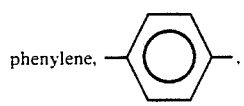

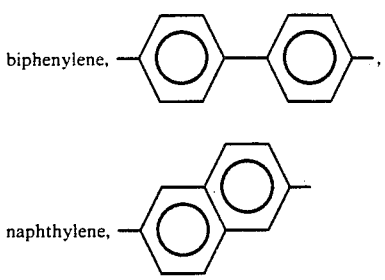

biphenylene, naphthylene, and the like. The Ar group may be substituted with 1 to 3, preferably 1 to 2, hydrocarbyl groups, e.g., alkyl groups containing 1 to 20 carbon atoms, or with 1 to 3 halogen radicals, e.g., chloro-, bromo-, or iodo-.

Preferred N-hydroxyaryl amine reactants are amino phenols of the formula:

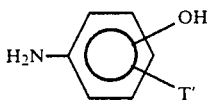

in which T' is hydrogen, an alkyl radical having from 1 to 3 carbon atoms or a halogen radical such as the chloride or bromide radical.

Suitable aminophenols include 2-aminophenol, 3-aminophenol, 4-aminophenol, 4-amino-3-methylphenol, 4-amino-3-chlorophenol, 4-amino-2-bromophenol and 4-amino-3-ethylphenol.

Suitable amino-substituted polyhydroxyaryls are the aminocatechols, the amino resorcinols, and the aminohydroquinones, e.g., 4-amino-1,2- dihydroxybenzene, 3-amino-1,2-dihydroxybenzene, 5-amino-1,3-dihydroxybenzene, 4-amino-1,3-dihydroxybenzene, 2-amino-1,4-dihydroxybenzene, 3-amino-1,4-dihydroxybenzene and the like.

Suitable aminonaphthols include 1-amino-5-hydroxynaphthalene, 1-amino-3-hydroxynaphthalene and the like.

THE ALDEHYDE MATERIAL

The aldehyde reactants (C) will generally comprise formaldehyde or paraformaldehyde, although it will be understood that other aldehyde-group containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula: R"CHO, wherein R" is H or aliphatic hydrocarbon radical having from 1 to 4 carbon atoms.

AMIDO-AMINE COMPOUNDS

Amido-amine compounds useful as reactant (D) in the present invention comprise reaction products of at least one polyamine and an alpha, beta-ethylenically unsaturated compound. Amine compounds useful include mono- and (preferably) polyamines, of about 2 to 60, preferably 2 to 40 (e.g. 3 to 20), total carbon atoms and about 2 to 12, preferably 3 to 12, and most preferably 3 to 9 nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

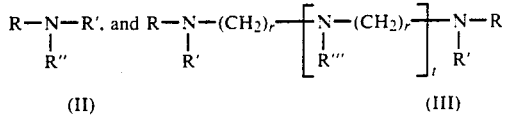

wherein R, R', R", and R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R''' can additionally comprise a moiety of the formula:

wherein R' is as defined above, and wherein r and r' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R''', r, r', t and t' be selected in a manner sufficient to provide the compounds of Formulas II and III with typically at least one primary or secondary amine group, preferably at least two primary or secondary amine groups. This can be achieved by selecting at least one of said R, R', R" or R''', groups to be hydrogen or by letting t in Formula III be at least one when R''' is H or when the IV moiety possesses a secondary amino group. The most preferred amine of the above formulas are represented by Formula III and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2 -hydroxyethyl)-1,3-propylene diamine; 3-dodecyloxypropylamine; N-dodecyl-1,3-propane diamine; tris hydroxymethylaminomethane (THAM); diisopropanol amine: diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (V):

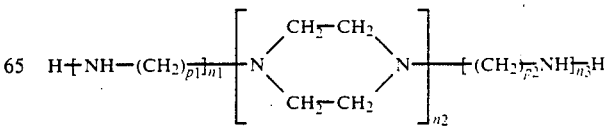

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric pipe razines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formula (VI):

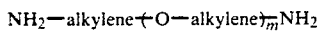

where m has a value of about 3 to 70 and preferably 10 to 35; and the formula (VII):

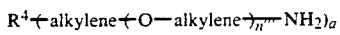

where $n'''$ has a value of about 1 to 40 with the provision that the sum of all the $n'''$ values is from about 3 to about 70 and preferably from about 6 to about 35, and $R^4$ is a polyvalent saturated hydrocarbon radical of up to ten carbon atoms wherein the number of substituents on the $R^4$ group is represented by the value of "a", which is a number of from 3 to 6. The alkylene groups in either formula (VI) or (VII) may be straight or branched chains containing about 2 to 7, and preferably about 2 to 4 carbon atoms.

The polyoxyalkylene polyamines of formulas (VI) or (VII) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The alpha, beta unsaturated compounds useful in this invention comprise compounds of the formula:

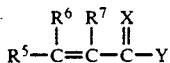

wherein X is sulfur or oxygen, Y is —$OR^8$, —$SR^8$, or —N $R^8(R^9)$, and $R^5$, $R^6$, $R^7$, $R^8$ and $R^9$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with for example the carbonyl group (—C(O)—) of the acrylate-type compound of formula X, or with the thiocarbonyl group (—C(S)—) of the thioacrylate-type compound of formula X.

When $R^5$, $R^6$, $R^7$, $R^8$ or $R^9$ in Formula VIII are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of $R^5$ through $R^9$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^5$ through $R^9$ are aryl, the aryl group will generally contain from 6 to 10 carbon atoms (e.g., phenyl, naphthyl).

When one or more of $R^5$ through $R^9$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $R^5$ through $R^9$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^5$ and $R^9$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^5$ through $R^9$ are heterocyclic, the heterocyclic group generally consists of a compound having at least one ring of 6 to 12 members in which on or more ring carbon atoms is replaced by oxygen or nitrogen. Examples of such heterocyclic groups are furyl, pyranyl, pyridy 1, piperidyl, dioxanyl, tetrahydrofuryl, pyrazinyl and 1,4-oxazinyl.

The alpha, beta ethylenically unsaturated carboxylate compounds employed herein have the following formula:

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate compounds of formula IX are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3- dimethyl-2-butenoate, methyl 3-phenyl-2-propenoate, and the like.

The alpha, beta ethylenically unsaturated carboxylate thioester compounds employed herein have the following formula:

 (X)

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate thioesters of formula X are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

 (XI)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated carboxyamides of formula XI are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

 (XII)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxylate compounds of formula XII are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl-2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

 (XIII)

wherein $R^5$, $R^6$, $R^7$, and $R^8$ are the same or different and are hydrogen or substituted or unsubstituted hydrocarbyl as defined above. Examples of alpha, beta-ethylenically unsaturated dithioic acids and acid esters of formula XIII are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

 (XIV)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxyamides of formula XIV are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

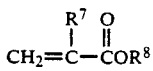 (XV)

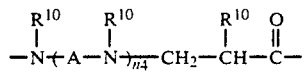

where $R^7$ is hydrogen or a $C_1$ to $C_4$ alkyl group, such as methyl, and $R^8$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of formula VIII wherein X' is oxygen, the resulting reaction product with the polyamine contains at least one amido linkage ($-C(O)N<$) and such materials are herein termed "amido-amines." Similarly, when the selected alpha, beta unsaturated compound of formula VIII comprises a compound wherein X' is sulfur, the resulting reaction product with the polyamine contains thioamide linkage ($-C(S)N<$) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula VIII tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10-300%, or greater, for 25-200%, is employed. For more efficient cross-linking an excess of carboxylated material should preferably be used since a cleaner reaction ensues. For example, a molar excess of about 10-100% or greater such as 10-50%, but preferably an excess of 30-50%, of the carboxylated material. Larger excess can be employed if desired.

In summary, without considering other factors, equimolar amounts of reactants tend to produce a more linear amido-amine whereas excess of the formula XII reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

has more labile hydrogens than ethylene diamine.

These amido-amine adducts so formed are characterized by both amido and amino groups. In their simplest embodiments they may be represented by units of the following idealized formula (XVI):

wherein the $R^{10}$'s, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and $n_4$ is an integer such as 1-10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines employed in this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula VIII are contacted in an amount of from about 1 to 10, more preferably from about 2 to 6, and most preferably from about 3 to 5, equivalents of primary amine in the polyamine reactant per mole of the unsaturated reactant of formula VIII.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°-90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of formula X liberates the corresponding $HSR^8$ compound (e.g., $H_2S$ when $R^8$ is hydrogen) as a by-product, and the reaction of an ethylenically unsaturated carboxyamide of formula XI liberates the corresponding $HNR^8(R^9)$ compound (e.g., ammonia when $R^8$ and $R^9$ are each hydrogen) as by-product.

The reaction time involved can vary widely depending on a wide variety of factors. For example, there is a relationship between time and temperature. In general, lower temperature demands longer times Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferred to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentaamine (TEPA) with methyl methacrylate can be illustrated as follows:

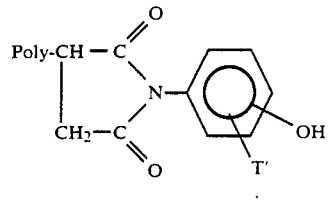

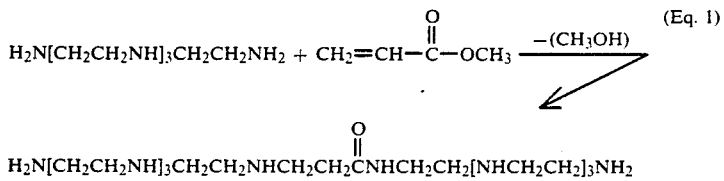
(Eq. 1)

PREPARATION OF THE POLYMER DISPERSANTS

In one preferred aspect of this invention, the novel dispersants of this invention are prepared by reacting the polymer substituted mono- or dicarboxylic acid material with the N-hydroxyaryl amine material to form a carbonyl-amino material containing at least one group having a carbonyl group bonded to a secondary or a tertiary nitrogen atom. In the amide form, the carbonyl-amino material can contain 1 or 2 —C(O)—NH— groups, and in the imide form the carbonyl-amino material will contain —C(O)—N—C(O)— groups. The carbonyl-amino material can therefore comprise N-(hydroxyaryl) polymer-substituted dicarboxylic acid diamide, N-(hydroxyaryl) polymer-substituted dicarboxylic acid imide, N-(hydroxyaryl) polymer substituted-monocarboxylic acid monoamide, N-(hydroxyaryl) polymer-substituted dicarboxylic acid monoamide or a mixture thereof.

In general, equimolar amounts of the polymer substituted mono- or dicarboxylic acid material, such as polymer substituted succinic anhydride, and of the N-hydroxyaryl amine, such as p-aminophenol, are dissolved in an inert solvent (i.e. a hydrocarbon solvent such as toluene, xylene, or isooctane) and reacted at a moderately elevated temperature up to the reflux temperature of the solvent used, for sufficient time to complete the formation of the intermediate N-(hydroxyaryl) hydrocarbyl amide or imide. When a polymer substituted monocarboxylic acid material is used, the resulting intermediate which is generally formed comprises amide groups. Similarly, when a polymer substituted dicarboxylic acid material is used, the resulting intermediate generally comprises imide groups, although amide groups can also be present in a portion of the carbonyl-amino material thus formed. Thereafter, the solvent is removed under vacuum at an elevated temperature, generally, at approximately 160° C. (1 mm).

Alternatively, the intermediate is prepared by combining equimolar amounts of the polymer substituted mono- or dicarboxylic acid material and the N-(hydroxyaryl) amine and heating the resulting mixture at elevated temperature under a nitrogen purge in the absence of solvent.

The resulting N-(hydroxyaryl) polymer substituted imides can be illustrated by the succinimides of the formula (XVII):

wherein T' is as defined above, and wherein "Poly" represents the polymer substituent group derived from the polymer (e.g., polybutylene). Similarly, when the polymer substituted monocarboxylic acid material is used, the resulting N-(hydroxyaryl) polymer substituted amides can be represented by the propionamides of the formula (XVIII):

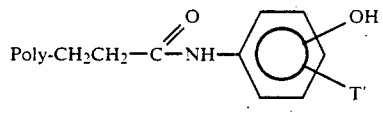

wherein T' and "Poly" are as defined above.

In the second step of this preferred aspect of the invention, the carbonyl-amino intermediate is reacted with an amine compound (or mixture of amine compounds), such as a polyfunctional amine, together with an aldehyde (e.g., formaldehyde) in the Mannich base reaction. In general, the reactants are admixed and reacted at an elevated temperature until the reaction is complete. This reaction may be conducted in the presence of a solvent and in the presence of a quantity of mineral oil which is an effective solvent for the carbonyl-amino intermediate and for the finished Mannich base dispersant material. This second step can be illustrated by the Mannich base reaction between the above N-(hydroxyphenyl) polymer succinimide intermediate, paraformaldehyde and an amido-amine in accordance with the following equation:

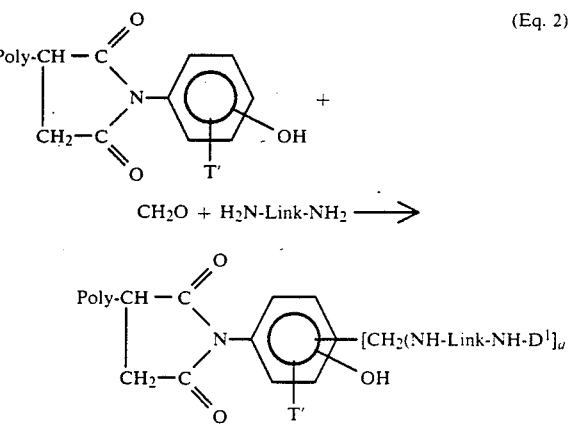
(Eq. 2)

wherein a is an integer of 1 or 2, "Poly" and T' are as defined above, $D^1$ is H when "a" is 2, $D^1$ is H or the moiety

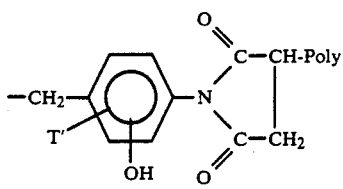

when "a" is 1, and "Link" is the amido moiety —$(C_2H_4NH)_4C(O)C_2H_4(NHC_2H_4)_4$—. Similarly, this second step can be illustrated by the Mannich base reaction between the above N-(hydroxyphenyl) polymer acrylamide intermediate, paraformaldehyde and ethylene diamine in accordance with the following equation:

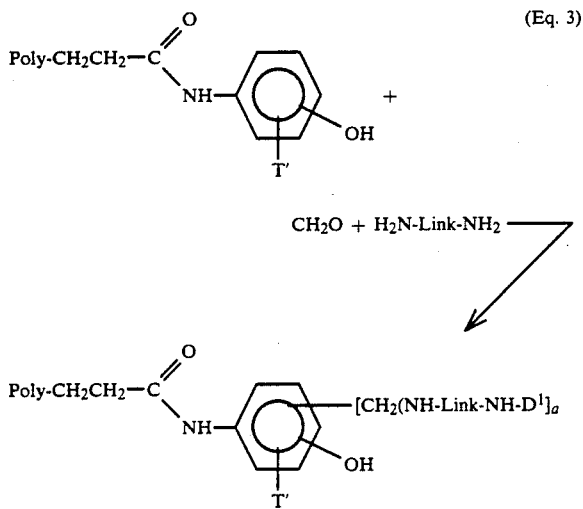
(Eq. 3)

wherein a is an integer of 1 or 2, "Poly" and R' are as defined above, $D^2$ is H when "a" is 2, and $D^2$ is H or the moiety

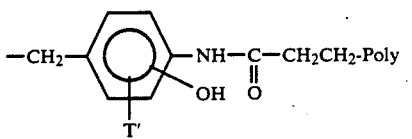

when "a" is 1.

Generally, the reaction of one mole of the carbonyl-amino material, e.g. a N-(hydroxyaryl) polymer succimide or amide intermediate, with two moles of aldehyde and one mole of amine will favor formation of the products comprising two moieties of bridged by an -alk-amine-alk-group wherein the "alk" moieties are derived from the aldehyde (e.g., —$CH_2$— from $CH_2O$) and the "amine" moiety is a bivalent bis-N terminated amino group derived from the amine reactant (e.g., from polyalkylene polyamine). Such products are illustrated by Equations 2 and 3 above wherein "a" is one, $D^1$ is the moiety

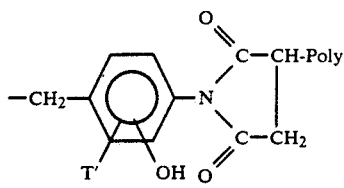

and $D^2$ is the moiety

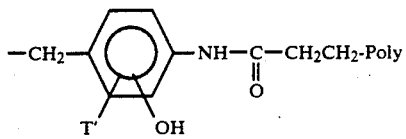

wherein T' and "Poly" are as defined above.

In a similar manner, the reaction of substantially equimolar amounts of the carbonyl-amino material, aldehyde and amine reactant favors the formation of products illustrated by Equations 2 and 3 wherein "a" is one and $D^1$ and $D^2$ are each H, and the reaction of one mole of carbonyl-amino material with two moles of aldehyde and two mole of the amine reactant permits the formation of increased amounts of the products illustrated by Equations 2 and 3 wherein "a" is two and $D^1$ and $D^2$ are each H.

In still other aspects of the invention, the order of reacting the various reactants is modified such that, for example, the N-hydroxyaryl amine is first admixed and reacted with the amido-amine material and aldehyde in the Mannich base reaction to form an aminomethyl hydroxyaryl amine material. Thereafter, the resulting intermediate adduct is reacted with the polymer substituted mono- or dicarboxylic acid material to form the desired dispersant. The sequence of reactions performed in accordance with this aspect of the invention tends to result in the formation of various dispersant isomers because of the plurality of aromatic materials formed in the first Mannich base condensation step and the primary and secondary nitrogen atoms which are available for reaction with the carboxy moieties of the mono- or dicarboxylic acid materials.

The Mannich base intermediate adduct formed by the reaction of the N-hydroxyaryl amine with the amine reactant and formaldehyde can comprise at least one compound selected from the group consisting of:

(a) adducts of the structure (XIX):

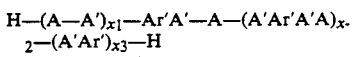

wherein $x_1$ is 0 or 1, $x_2$ is an integer of 0 to 8, $x_3$ is 0 or 1, "A" is a bivalent bis-N terminated amino group derived from the amido-amine reactant and comprises an amido-amine group containing from 2 to 60 (preferably from 2 to 40) carbon atoms and from 2 to 12 (preferably from 3 to 13) nitrogen atoms, and A' comprises the group —CH(T")— wherein T" is H or alkyl of from 1 to 9 carbon atoms and is derived from the corresponding aldehyde reactant, and Ar' comprises the moiety (XX):

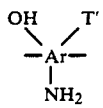

wherein T' and Ar are as defined above for the N-hydroxyaryl amines employed in this invention; and (b) adducts of the structure (XXI):

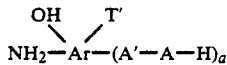

wherein "a", T', A', A and Ar are as defined above. Preferred adducts of formula XIX above are those wherein $x_1$ is 0, $x_2$ is 1 to 3, and $x_3$ is 1, and most preferably wherein T' is H or alkyl of 1 to 3 carbon atoms, Ar is phenylene. Preferred adducts of formula XX are those wherein Ar is phenylene.

-continued

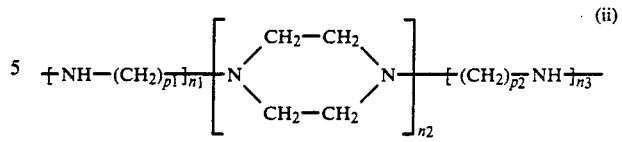

and

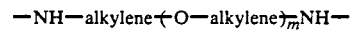

wherein R', R" and "r" are as defined above with respect to Formula II; $p_1$, $p_2$, $n_1$ and $n_2$ are as defined above with respect to Formula II; "alkylene" and "m" are as defined above with respect to Formula VI; and $R^5$, $R^7$ and X are as defined above with respect to Formula VII.

Illustrative adducts of the structure XIX are set forth in Table B below:

TABLE B

| $X_1$ | $X_2$ | $X_3$ | Ar' | A' | A |
|---|---|---|---|---|---|
| 0 | 2 | 1 | —Ph(OH)(NH$_2$)— | —CH$_2$— | —NH(EtNH)$_2$C(O)Et(NHEt)$_2$NH— |
| 0 | 2 | 1 | " | " | —NH(EtNH)$_3$C(O)EtEt(NHEt)$_3$NH |
| 0 | 1 | 0 | " | " | —NH(EtNH)$_2$C(O)EtEtNHEt)$_2$NH— |
| 0 | 0 | 0 | " | " | —NH(EtNH)$_3$C(O)Et(NHEt)$_3$NH |
| 0 | 1 | 1 | " | " | —NH(EtNH)$_2$C(O)Et(NHEt)$_2$NH— |
| 0 | 1 | 1 | " | " | —NH(EtNH)$_3$C(O)Et(NHEt)$_3$NH |
| 1 | 2 | 0 | " | —CH(CH$_3$)— | —NH(EtNH)$_2$C(O)Et(NHEt)$_2$NH— |
| 1 | 0 | 1 | " | " | —NH(EtNH)$_5$C(O)Et(NHEt)$_5$NH— |
| 1 | 3 | 0 | " | " | —NH(EtNH)$_5$C(O)Et(NHEt)$_5$NH— |
| 1 | 1 | 0 | " | " | —NH(EtNH)$_5$C(O)Et(NHEt)$_5$NH— |
| 1 | 1 | 1 | " | " | —NH(EtNH)$_5$C(O)Et(NHEt)$_5$NH— |
| 0 | 2 | 1 | " | " | —NH(EtNH)$_6$C(O)Et(NHEt)$_6$NH |

(Ph = phenyl)
(Et = —C$_2$H$_5$—)

Preferably, the "A" bivalent amido-amino group will comprise terminal —NH— groups, as exemplified by the structures of the formula (XXII):

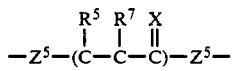

wherein $R^5$ and $R^7$ are as defined above and wherein $Z^5$ comprises at least one member selected from the group consisting of

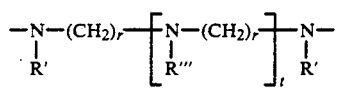

Illustrative adducts of structure XXI are set forth below herein Ar is tri- or tetra-substituted phenyl:

TABLE C

| a | T' | A' | A |
|---|---|---|---|
| 1 | H | —CH$_2$— | —NH(EtNH)$_2$C(O)Et(NHEt)$_2$NH— |
| 2 | CH$_3$ | " | —NH(EtNH)$_3$C(O)Et(NHEt)$_3$NH— |
| 1 | CH$_3$ | " | —NH(EtNH)$_2$C(O)Et(NHEt)$_2$NH— |
| 2 | C$_2$H$_5$ | " | —NH(EtNH)$_5$C(O)Et(NHEt)$_5$NH— |
| 1 | C$_3$H$_7$ | " | —NH(EtNH)$_5$C(O)Et(NHEt)$_5$NH— |
| 2 | C$_4$H$_9$ | " | —NH(EtNH)$_6$C(O)Et(NHEt)$_6$NH— |
| 1 | H | —CH(CH$_3$)— | —NH(EtNH)$_4$C(O)Et(NHEt)$_4$NH— |
| 2 | CH$_3$ | " | —NH(EtNH)$_5$C(O)Et(NHEt)$_5$NH— |

(Et = —C$_2$H$_5$—)

For the sake of illustration, this aspect of the invention may be represented by the following equations:

Dicarboxylic acid materials:

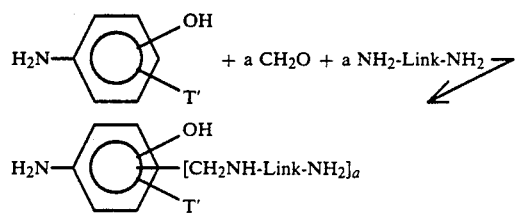

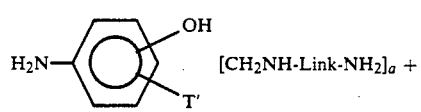

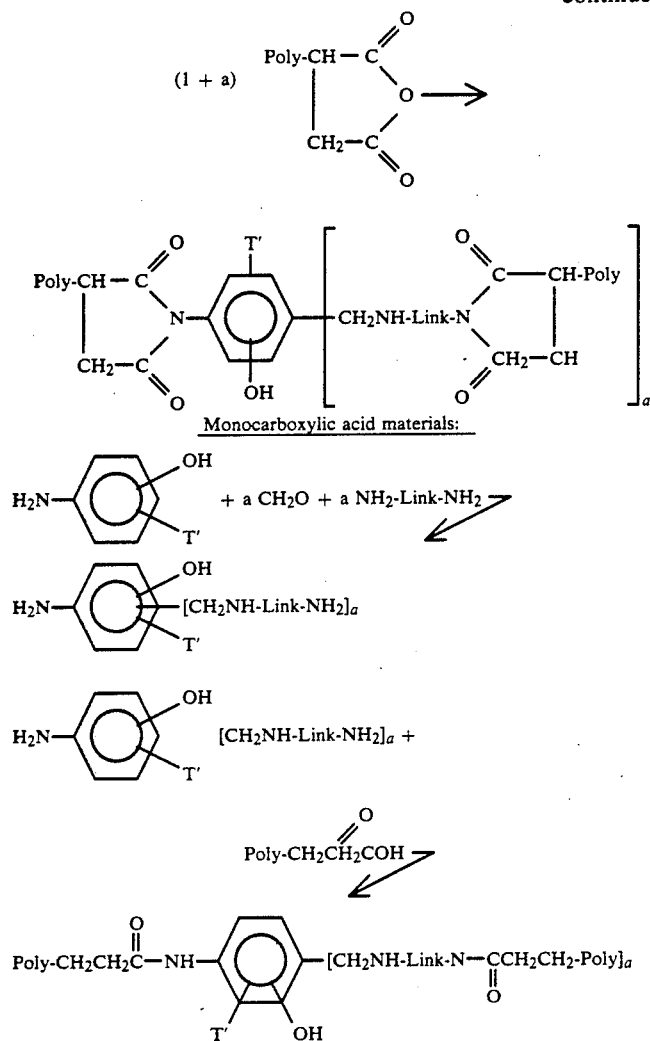

wherein "Poly", "Link", T' and "a" are as defined above.

In one preferred embodiment of the invention, a carbonyl-amino material comprising a polyisobutylene substituted N-(hydroxyaryl) succinimide, which has been prepared by first reacting a polyisobutylene-substituted succinic anhydride with an aminophenol to form an intermediate product, is reacted with formaldehyde and an amido-amine (formed as described herein) in the Mannich base reaction as outlined above to form the improved dispersants of this invention. In another preferred embodiment of the invention, an aminophenol is first reacted with formaldehyde and an amido-amine in the Mannich base reaction as outlined above to form an intermediate material containing from one to three (polyamino) methyl-substituted aminohydroxyaryl groups per molecule, followed by reacting this intermediate with a polyisobutylene-substituted succinic anhydride to form the improved dispersants of this invention.

A preferred group of Mannich Base ashless dispersants are those formed by condensing polyisobutylene substituted N-(hydroxy-phenol) succinimide with formaldehyde and an amido-amine formed by reaction of a lower alkyl ester of acrylic or methacyrlic acid with at least one of polyethylene amines, e.g., tetraethylene pentamine, pentaethylene hexamine, polyoxyethylene and polyoxypropylene amines, e.g., polyoxypropylene diamine, and combinations thereof. One particularly preferred dispersant combination involves a condensation of (A) polyisobutylene substituted succinic anhydride or propionic acid, (B) aminophenol, (C) formaldehyde, and (D) at least one amido-amine comprising the reaction product of an alpha, beta-ethylenically unsaturated compound of formula (VIII) above with at least one of (D-1) a polyoxyalkylene polyamine, e.g., polyoxypropylene diamine, and (D-2) a polyalkylene polyamine, e.g. polyethylene diamine and tetraethylene pentamine, using a A:B:C:D molar ratio of 1:1–8:1:0-.1–10, and preferably 1:2–6:1:1–4, wherein the A:(D-1):(D-2) molar ratio is 1:0–5:0–5, and preferably 1:0–4:-1–4.

Most preferably, when the aldehyde comprises formaldehyde (or a material which generates formaldehdye in situ), and the amido-amine comprises a di-primary amine (e.g., reaction product of lower alkyl acrylates and/or methacrylates with a polyalkylene polyamine), the formaldehyde and diprimary amido-amine are employed in an amount of about 2(n−1) moles of formaldehyde and about (n−1) moles of diprimary amido-amine per "n" molar equivalents charged of the hydroxy-aryl group (whether in the form of a carbonyl-amino material, e.g. as in Formulae XVII and XVIII above, or in the form of an N-(hydroxyaryl) amine reactant, e.g. as in Formula I above).

The reaction product mixture comprising the desired polymer substituted Mannich Base condensation product formed by the process of this invention will generally be present in the condensation reaction product mixture in a concentration of at least about 60 wt. % (e.g., from 65 to 95 wt. %), more preferably at least about 70 wt. %, from 75 to 90 wt. %

Another aspect of this invention involves the post treatment of the nitrogen containing dispersant materials. The process for post-treating said nitrogen containing dispersant materials is analogous to the post-treating processes used with respect to derivatives of conventional ethylene copolymers of the prior art. Accordingly, the same reaction conditions, ratio of reactants and the like can be used.

The nitrogen-containing dispersant materials of the instant invention as described above are post-treated by contacting said nitrogen-containing dispersant materials with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols, and $C_1$ to $C_{30}$ hydrocarbyl substituted succinic acids and anhydrides (e.g., succinic anhydride, dodecyl succinic anhydride and the like), fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, and the like.

For example, the nitrogen containing dispersants can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Usefully the borated dispersants of the invention contain from about 0.05 to 2.0 wt. %, e.g. 0.05 to 0.7 wt. % boron based on the total weight of said borated nitrogen-containing dispersant compound. The boron, which appears to be in the product as dehydrated boric acid polymers (primarily $(HBO_2)_3$), is believed to attach to the dispersant as amine salts, e.g., the metaborate salt of said amine dispersants.

Treating is readily carried out by adding from about 0.05 to 4, e.g. 1 to 3 wt. % (based on the weight of said nitrogen compound) of said boron compound, preferably boric acid which is most usually added as a slurry to said nitrogen compound and heating with stirring at from about 135° C. to 190°, e.g. 140°–170° C., for from 1 to 5 hours followed by nitrogen stripping at said temperature ranges.

Since post-treating processes involving the use of these post-treating reagents is known insofar as application to high molecular weight nitrogen containing dispersants of the prior art, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704, 3,551,466; 3,415,750; 3,312,619; 3,280,034; 3,718,663; 3,652,616; UK Pat. Nos. 1,085,903; 1,162,436; U.S. Pat. No. 3,558,743.

The nitrogen containing dispersant materials of this invention can also be treated with polymerizable lactones (such as epsilon-caprolactone) to form dispersant adducts having the moiety $—[C(O)(CH_2)_zO]_mH$, wherein z is a number of from 4 to 8 (e.g., 5 to 7) and m has an average value of from about 0 to 100 (e.g., 0.1 to 20). The dispersants of this invention can be post-treated with a $C_5$ to $C_9$ lactone, e.g., $C_6$ to $C_9$ lactone (preferably epsilon-caprolactone), by heating a mixture of the dispersant material and lactone in a reaction vessel in the absence of a solvent at a temperature of about 50° C. to about 200° C., more preferably from about 75° C. to about 180° C., and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the $C_5$ to $C_9$ lactone, e.g., epsilon-caprolactone, is reacted with a dispersant material in a 1:1 mole ratio of lactone to dispersant material. In practice, the ratio of lactone to dispersant material may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.1 to about 20 being more preferred. For optimum dispersant performance, sequences of from about 1 to about 5 lactone units in a row are preferred.

Catalysts useful in the promotion of the lactone-dispersant material reactions are selected from the group consisting of stannous octanoate, stannous hexanoate, tetrabutyl titanate, a variety of organic based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary of adducts formed by reaction of dispersant materials if this invention and epsilon-caprolactone are those adducts illustrated by the following equation:

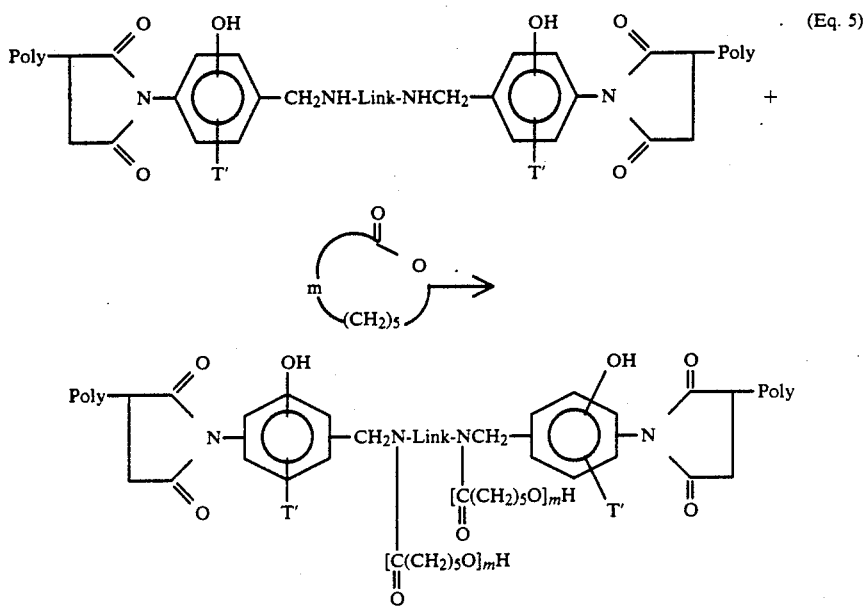

wherein m, "Link", and "Poly" are as defined above.

The reactions of such lactones with dispersant materials containing nitrogen or ester groups is more completely described in copending applications Ser. Nos. 916,108; 916,217; 916,218; 916,287; 916,303; 916,113; and 916,114, all filed on Oct. 7, 1986; and co-pending Ser. No. 178,099 filed on Apr. 6, 1988; the disclosure of each of which is hereby incorporated by reference in its entirety.

Further aspects of the present invention reside in the formation of metal complexes of the novel dispersant additives prepared in accordance with this invention. Suitable metal complexes may be formed in accordance with known techniques of employing a reactive metal ion species during or after the formation of the present dispersant materials. Complex forming metal reactants include the metal nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be also found in U.S. Pat. No. 3,306,908 and U.S. Pat. No. Re. 26,433, the disclosures of which are hereby incorporated by reference in their entirety.

The processes of these incorporated patents, as applied to the compositions of this invention, and the post-treated compositions thus produced constitute a further aspect of this invention.

The dispersants of the present invention can be incorporated into a lubricating oil in any convenient way. Thus, these mixtures can be added directly to the oil by dispersing or dissolving the same in the oil at the desired level of concentrations of the dispersant and detergent, respectively. Such blending into the additional lube oil can occur at room temperature or elevated temperatures. Alternatively, the dispersants can be blended with a suitable oil-soluble solvent and base oil to form a concentrate, and then blending the concentrate with a lubricating oil basestock to obtain the final formulation. Such dispersant concentrates will typically contain (on an active ingredient (A.I.) basis) from about 20 to about 60 wt. %, and preferably from about 40 to about 50 wt. %, dispersant additive, and typically from about 40 to 80 wt. %, preferably from about 40 to 60 wt. %, base oil, based on the concentrate weight.

The lubricating oil basestock for the dispersant typically is adapted to perform a selected function by the incorporation of additional additives therein to form lubricating oil compositions (i.e., formulations).

The lubricating oil basestock for the dispersant typically is adapted to perform a selected function by the incorporation of additional additives therein to form lubricating oil compositions (i.e., formulations).

LUBRICATING COMPOSITIONS

The additive mixtures of the present invention possess very good dispersant properties as measured herein in a wide variety of environments. Accordingly, the additive mixtures are used by incorporation and dissolution into an oleaginous material such as fuels and lubricating oils. When the additive mixtures of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed.

The additive mixtures of the present invention find their primary utility in lubricating oil compositions which employ a base oil in which the additives re dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc., all as described in U.S. Pat. No. 4,797,219, the disclosure of which is hereby incorporated by reference in its entirety. Some of these numerous additives can provide a multiplicity of effects, e.g. a dispersant-oxidation inhibitor. This approach is well known and need not be further elaborated herein.

In the preparation of lubricating oil formulations it is common practice to introduce the additives in the form of 10 to 80 wt. %, e.g., 20 to 80 wt. % active ingredient concentrates in hydrocarbon oil, e.g. mineral lubricating oil, or other suitable solvent. Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The ashless dispersants of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tert-butylphenyl)silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
| --- | --- | --- |
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention.

EXAMPLE 1

Preparation of Polyisobutylene Succinic Anhydride (PIBSA)

A polyisobutenyl succinic anhydride having a SA:-PIB ratio of 1.13 is prepared by heating a mixture of 100 parts of polyisobutylene (2225 $\overline{M}_n$; $\overline{M}_w/\overline{M}_n=2.5$) with 6.14 parts of maleic anhydride to a temperature of about 220° C. When the temperature reaches 120° C., the chlorine addition is begun and 5.07 parts of chlorine at a constant rate are added to the hot mixture for about 5.5 hours. The reaction mixture is then heat soaked at 220° C. for about 1.5 hours and then stripped with nitrogen for about one hour. The resulting polyisobutenyl succinic anhydride has an ASTM Saponification Number of 54. The PIBSA product is 80 wt. % active ingredient (A.I.), the remainder being primarily unreacted PIB.

Preparation of Amido Amines

A series of amido-amines are prepared as follows: Amido-amine I is prepared by reacting TEPA with methyl acrylate at a 2:1 TEPA:methyl methacrylate molar ratio, to form a product mixture having 30.1 wt. % total N, 8.2 wt. % primary N, and containing about 50 wt. % unreacted TEPA. Amido-amine II is prepared similarly, except that a 1.5:1 TEPA:methyl acrylate molar ratio is employed, to form a product mixture containing 28.3 wt. % total N, 6.1 wt. % primary N, and about 25 wt. % unreacted TEPA.

EXAMPLE 2

Preparation of PIBSA-Substituted Amino Phenol

A mixture containing 104 g. (0.05 mole) of the polyisobutylene polymer substituted succinic anhydride material prepared as in Example 1, 5.45 g. (0.05 mole) of 4-aminophenol and 67 g. of S150N lubricating oil is stirred and slowly heated to 160° C. while under a nitrogen blanket. The reaction mixture is then heated at 160° C. for 3 hours and filtered. The resulting oil solution of polyisobutylene polymer substituted N-(hydroxyphenyl) succinimide analyzes for 0.22 wt % N.

EXAMPLE 3

Preparation of Mannich Base Condensation Dispersant Material

About 59.6 g. (0.014 mole) of the N-(hydroxyphenyl) polyisobutylene polymer substituted succinimide solution prepared as in Example 2 is mixed with 2.19 g. (0.014 equivalent of primary N) of amido-amine I, 0.46 g. (0.015 mole) of formaldehyde, and 2.5 g. of S150N and reacted at 80° C. for one hour under nitrogen atmosphere. The reaction mixture is then heated to 160° C. for one hour and stripped at 160° C. for another hour with nitrogen gas. The reaction product analyzes for 1.28 wt % N.

EXAMPLE 4

A portion of the dispersant of Example 3 is reacted with boric acid to provide a S150N solution containing a borated polyisobutenyl succinimide having a nitrogen content of about 1.28 wt. % a boron content of 0.23 wt. % (50% a.i.) and 50 wt. % of unreacted PIB and mineral oil (S150N).

EXAMPLE 5

Mannich Base Condensation

The procedure of Example 3 is repeated except that about 59.6 g. (0.014 mole) of the N-(hydroxyphenyl) polyisobutylene polymer substituted succinimide solution prepared as in Example 2 is mixed with 2.77 g. (0.014 equivalent of primary N) of a amido-amine II, 0.46 g. (0.015 mole) of formaldehyde and 5.6 g. of S150N. The reaction product analyzes for 1.49 wt % N.

EXAMPLE 6

Preparation of Mannich Base Condensation Intermediate

About 109 g. (1.0 mole) of 4-aminophenol is dissolved in 100 ml. of toluene. To the solution is added 79.6 g. (0.5 equivalents of primary N) of amido-amine I and 33 g. (1.1 mole) of formaldehyde at 30° C. under $N_2$. The mixture is heated to 100° C. and kept at that temperature for 1 hour in a four necked round bottomed 500 mol flask. Then, the reaction mixture is heated at about 120° C. for about one hour to remove the water of reaction by azeotrope. The reaction mixture is then cooled to room temperature and filtered. The filtrate is then stripped at 130° C. with dry $N_2$ gas to remove toluene.

EXAMPLE 7

Preparation of Mannich Base Condensation Dispersant Material

About 68.6 g. of the polyisobutylene polymer substituted succinic anhydride solution prepared as in Example 1 and 8.95 g. of the 4-hydroxyphenol amido-amine II formaldehyde Mannich Base condensate product solution prepared as in Example 6 and 63 g. of S150N lubricating oil. The reaction mixture is then heated at 160° C. for 3 hours and filtered. The resulting oil solution of Mannich Base condensate dispersant material analyzes for 1.44 wt % N.

EXAMPLE 8

A portion of the dispersant of Example 7 is reacted with boric acid to provide a S150N solution containing a borated polyisobutenyl succinimide having a nitrogen content of about 1.44 wt. %, a boron content of 0.23 wt. % (50% a.i.) and 50 wt. % of unreacted PIB and mineral oil (S150N).

EXAMPLE 9

A polyisobutenyl succinic anhydride (PIBSA) having a SA:PIB ratio of 1.24, is prepared by heating a mixture of 100 parts of polyisobutylene (1320 $\overline{M}_n$; $\overline{M}_w/\overline{M}_n = 2.5$) with 11 parts of maleic anhydride to a temperature of about 220° C. When the temperature reaches 120° C., the chlorine addition is begun and 10 parts of chlorine at a constant rate are added to the hot mixture for about 5 hours. The reaction mixture is then heat soaked at 220° C. for about 1.5 hours and then stripped with nitrogen for about one hour. The resulting polyisobutenyl succinic anhydride was diluted with S150 mineral oil to obtain a product having an ASTM Saponification Number of 69. The PIBSA product is 59 wt. % active ingredient (A.I.), the remainder being primarily unreacted PIB and mineral oil.

EXAMPLE 10

Preparation of PIBSA-Substituted Amino Phenol

A mixture containing 81 g. (0.05 mole) of the polyisobutylene polymer substituted succinic anhydride material prepared as in Example 9, 5.45 g. (0.05 mole) of 4-aminophenol and 35 g. of S150N lubricating oil is stirred and slowly heated to 160° C. while under a nitrogen blanket. The reaction mixture is then heated at 60° C. for 3 hours and filtered. The resulting oil solution of polyisobutylene polymer substituted N-(hydroxyphenyl) succinimide analyzes for 0.59 wt % N.

EXAMPLE 11

Preparation of Mannich Base Condensation Dispersant Material

About 59.6 g. (.025) of the N-(hydroxyphenyl) polyisobutylene polymer substituted succinimide solution prepared as in Example 10 is mixed with 1.96 g. (0.0125 equivalents of primary N) of amido-amine I, 0.42 g. (0.014 mole) of formaldehyde, and 2.5 g. of S150N and reacted at 80° C. for one hour under nitrogen atmosphere. The reaction mixture is then heated to 160° C. for one hour and stripped at 160° C. for another hour with nitrogen gas. The reaction product analyzes for 1.52 wt % N.

EXAMPLE 12

A portion of the dispersant of Example 11 is reacted with boric acid to provide a S150N solution containing a borated polyisobutenyl succinimide having a nitrogen content of about 1.52 wt. %, a boron content of 0.23 wt. % (50% a.i.) and 50 wt. % of unreacted PIB and mineral oil (S150N).

EXAMPLE 13

Mannich Base Condensation

The procedure of Example 11 is repeated except that about 59.6 g. of the N-(hydroxyphenyl) polyisobutylene polymer substituted succinimide solution prepared as in Example 10 is mixed with 2.5 g. (0.0125 equivalents of primary N) of a amido-amine II, 0.46 g. (0.014 mole) of formaldehyde and 5.6 g. of S150N. The reaction product analyzes for 1.72 wt % N.

EXAMPLE 14

Preparation of Mannich Base Condensation Intermediate

About 109 g. (1.0 mole) of 4-aminophenol is dissolved in 100 ml. of toluene. To the solution is added 159 g. (0.5 mole) of amido-amine I and 33 g. (1.1 mole) of formaldehyde at 30° C. under $N_2$. The mixture is heated to 100° C. and kept at that temperature for 1 hour in a four necked round bottomed 500 mol flask. Then, the reaction mixture is heated at about 120° C. for about one hour to remove the water of reaction by azeotrope. The reaction mixture is then cooled to room temperature and filtered. The filtrate is then stripped at 130° C. with dry $N_2$ gas to remove toluene.

EXAMPLE 15

Preparation of Mannich Base Condensation Dispersant Material

About 68.6 g. of the polyisobutylene polymer substituted succinic anhydride solution prepared as in Example 9 and 8.95 g. of the 4-hydroxyphenol amido-amine II formaldehyde Mannich Base condensate product solution prepared as in Example 14 and 63 g. of S150N lubricating oil. The reaction mixture is then heated at 160° C. for 3 hours and filtered. The resulting oil solution of Mannich Base condensate dispersant material analyzes for 1.30 wt % N.

EXAMPLE 16

A polyisobutenyl succinic anhydride having a succinic anhydride (SA) to polyisobutenylene mole ratio (i.e., a SA:PIB ratio) of 1.04 is prepared by heating a mixture of 100 parts of polyisobutylene (940 $\overline{M}_n$; $\overline{M}_w/\overline{M}_n = 2.5$) with 13 parts of maleic anhydride to a temperature of about 220° C. When the temperature reaches 120° C., the chlorine addition is begun and 10.5 parts of chlorine at a constant rate are added to the hot mixture for about 5.5 hours. The reaction mixture is then heat soaked at 220° C. for about 1.5 hours and then stripped with nitrogen for about one hour. The resulting polyisobutenyl succinic anhydride has an ASTM Saponification Number of 112. The PIBSA product is 90 wt. % active ingredient (A.I.), the remainder being primarily unreacted PIB. The resulting PIBSA material is then employed in an additional series of experiments as in Examples 10-15.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A lubricating oil dispersant additive useful in oleaginous compositions which comprises a condensation product obtained by the reaction of:
   (a) at least one polymer substituted mono- or dicarboxylic acid material comprising polymer substituted with at least monounsaturated dicarboxylic acid moieties selected from the group consisting of $C_4$ to $C_{10}$ monounsaturated dicarboxylic acid producing moieties, and $C_3$ to $C_{10}$ monounsaturated monocarboxylic acid producing moieties, wherein said polymer has a number average molecular weight of from about 300 to 10,000;
   (b) at least one N-hydroxyaryl amine compound;
   (c) at least one aldehyde reactants; and
   (d) at least one amido-amine or a thioamido-amine comprising a reaction product of at least one polyamine and an alpha, beta-unsaturated compound of the formula;

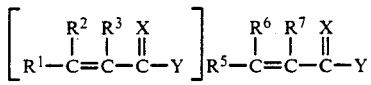

wherein X is sulfur or oxygen Y is $-OR^8$, $-SR^8$ or $NR^8(R^9-)$ wherein $R^5$, $R^6$, $R^7$, $R^8$ and $R^9$ are the same or different and are hydrogen or substituted or unsubstituted hydrocarbyl.

2. The dispersant additive according to claim 1, wherein said polyamine comprises amines containing from 2 to 60 carbon atoms and from 2 to 12 nitrogen atoms per molecule.

3. The dispersant additive according to claim 2, wherein said polyamine comprises a polyalkylenepolyamine wherein each said alkylene group contain 2 to 6 carbons and said polyalkylenepolyamine contains from 5 to about 9 nitrogen atoms per molecule.

4. The dispersant additive according to claim 1, wherein said hydrocarbyl substituted $C_4$ to $C_{10}$ monounsaturated dicarboxylic acid producing material comprises polyisobutylene of about 900 to 4000 number average molecular weight substituted with succinic anhydride moieties, said polyamine comprises polyalkylenepolyamine wherein each said alkylene group contain 2 to 6 carbons and said polyalkylenepolyamine contains 5 to 9 nitrogen atoms per molecule, and said alpha, beta-unsaturated compound comprises at least one member selected from the group consisting of methyl acrylate, ethyl acrylate, propyl acrylate, butyl acrylate, methyl methacrylate, ethyl methacrylate, propyl methacrylate, and butyl methacrylate.

5. The dispersant additive according to claims 1 or 4, wherein said polyamine comprises polyethylenepolyamine or polypropyleneamine.

6. The dispersant additive according to claims 1 or 4, wherein said dispersant is borated to provide from about 0.05 to 2.0 weight percent boron in the borated dispersant.

7. The dispersant additive according to claims 1 or 4, wherein said olefin polymer comprises polyisobutylene.

8. The dispersant additive of any one of claims 1 to 4, wherein the ratio of acid producing moieties per molecule of olefin polymer in said dispersant is from about 1.05 to 1.8.

9. The dispersant additive of claim 8, wherein said number average molecular weight of said olefin polymer is from about 1300 to 3000.

10. The dispersant additive of claim 1, wherein said monounsaturated acid material comprises maleic anhydride.

11. The dispersant additive according to claims 1 or 4 wherein about 1 to 5 moles of said acid producing material per primary nitrogen equivalent of said amido-amine are present in said reaction mixture.

12. The dispersant additive according to claims 1 or 4 wherein said polyamine contains an average of at least 2 primary nitrogen atoms per molecule, said X group is oxygen and said polyamine and said alpha, beta-unsaturated compound are contacted in an amount of from about 3 to 5 equivalents of said polyamine (based on said primary amine content) per mole of said alpha, beta unsaturated compound.

13. The dispersant additive according to claim 12 wherein said amido-amine contains an average of from 1 to 3 amido groups per molecule of said amido-amine.

14. The dispersant additive according to claims 1 or 4 wherein said polyamine contains an average of at least 2 primary nitrogen atoms per molecule, said X group is sulfur and said polyamine and said alpha, beta-unsaturated compound are contacted in an amount of from about 3 to 5 equivalents of said polyamine (based on said primary amine content) per mole of said alpha, beta unsaturated compound.

15. The dispersant additive according to claim 14 wherein said amido-amine contains an average of from 1 to 3 amido groups per molecule of said amido-amine.

16. The dispersant additive according to claim 1 wherein said N-hydroxyaryl amine compound comprises at least one member selected from the group consisting of compounds of the formula:

$$H_2N-Ar-OH$$

wherein Ar represents

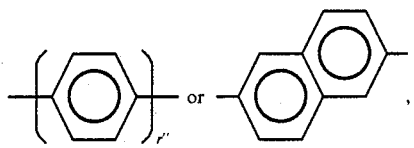

and wherein r″ is 1 or 2, and derivatives thereof wherein from 1 to 3 ring carbon atoms are each substituted by an alkyl group or halogen atom.

17. The dispersant additive according to claim 4 wherein said N-hydroxyaryl amine compound comprises at least one member selected from the group consisting of compounds of the formula:

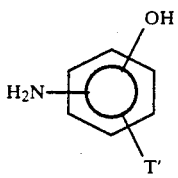

in which T', is hydrogen, alkyl having from 1 to 3 carbon atoms or halogen.

18. The dispersant additive according to claim 12 wherein the Ar group is phenyl.

19. A concentrate containing from about 3 to 45 weight percent of the dispersant additive of claim 1.

20. A concentrate containing from about 10 to 35 weight percent of the dispersant additive of claim 2.

21. A lubricating oil composition containing from about 0.1 to 20 weight percent of the dispersant additive of claims 1 or 2.

22. A lubricating oil composition containing from about 0.1 to 20 weight percent of the dispersant additive of claim 13.

23. A process for producing a lubricating oil dispersant additive useful in oleaginous compositions which comprises:
(i) providing a carbonyl-amino material obtained by reacting (a) at least one polymer substituted mono- or dicarboxylic acid material comprising polymer substituted with $C_4$ to $C_{10}$ monounsaturated dicarboxylic acid producing moieties, or $C_3$ to $C_{10}$ monounsaturated monocarboxylic acid moieties, wherein said polymer has a number average molecular weight of from about 300 to 10,000; with (b) at least one N-hydroxyaryl amine compound, to form said carbonxyl-amino material;
(ii) providing an amido-amine or thioamido-amine compound comprising a reacting product of at least one polyamine and an alpha, beta-unsaturated compound of the formula:

$$\left[ \begin{array}{c} R^2 \ R^3 \ X \\ | \ | \ \| \\ R^1-C=C-C-Y \end{array} \right] \begin{array}{c} R^6 \ R^7 \ X \\ | \ | \ \| \\ R^5-C=C-C-Y \end{array}$$

wherein X is sulfur or oxygen, Y is $-OR^8$, $SR^8$ or $-NR^8-(R^9-)$, wherein $R^5$, $R^6$, $R^7$, $R^8$ and $R^9$ are the same or different and are hydrogen or substituted or unsubstituted hydrocarbyl; and
(iii) contacting said carbonyl-amino material with (c) at least one aldehyde reactant; and (d) said amino-amine or thioamide-amine reactant for a time and under conditions sufficient to form said dispersant additive.

24. The process of claim 23 wherein said polymer comprises polybutylene.

25. The process of claim 24 wherein said polymer has a number average molecular weight of from about 700 to about 5,000.

26. The process of claim 25 wherein said number average molecular weight is between about 1,300 and 3,000.

27. The process according to claim 23 wherein said polyamine contains from 2 to 60 carbon atoms and from 2 to 12 nitrogen atoms per molecule.

28. The process according to claim 27 wherein said polyamine comprises a polyalkylenepolyamine wherein each said alkylene group contains 2 to 6 carbons and said polyalklylenepolyamine contains from 2 to about 9 nitrogen atoms per molecule.

29. The process according to claim 28 wherein said polyamine comprises polyethylenepolyamine.

30. The process according to claim 23 wherein said hydrocarbyl substituted $C_4$ to $C_{10}$ monounsaturated dicarboxylic acid producing material comprises polyisobutylene of about 900 to 5000 number average molecular weight substituted with succinic anhydride moieties, said polyamine comprises polyalkylenepolyamine wherein each said alkylene group contain 2 to 6 carbons and said polyalkylenepolyamine contains 5 to 9 nitrogen atoms per molecule, and said alpha, beta-unsaturated compound comprises at least one member selected from the group consisting of methyl acrylate, methyl methacrylate, propyl acrylate, butyl acrylate, methyl methacrylate, ethyl methacrylate, propyl methacrylate, and butyl methacrylate.

31. The process according to claim 23 wherein said N-hydroxyaryl amine compound comprises at least one member selected from the group consisting of compounds of the formula:

$$H_2N-Ar-OH$$

wherein Ar represents

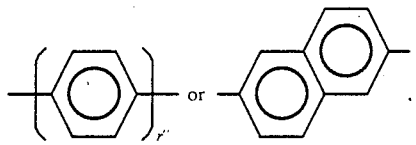

and wherein r" is 1 or 2, and derivatives thereof wherein from 1 to 3 ring carbon atoms are each substituted by an alkyl group or halogen atom.

32. The process according to claim 30 wherein said N-hydroxyaryl amine compound comprises at least one member selected from the group consisting at compounds of the formula:

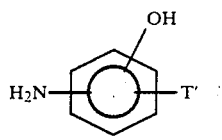

in which T' is hydrogen, alkyl having from 1 to 3 carbon atoms or halogen.

33. The process according to claim 32 wherein the Ar group is phenyl.

34. The process according to claim 33 wherein said N-hydroxyaryl amine compound comprises 4-aminophenol.

35. A lubricating oil dispersant additive useful in oleaginous compositions which comprises a Mannich Base condensation product obtained by the steps of:
(i) providing a N-hydroxyaryl amine-containing Mannich base intermediate obtained by reacting at least one N-hydroxyaryl amine compound, at least one aldehyde reactant and at least one amino-amine or thioamido-amine reactant, said N-hydroxyaryl amine-containing Mannich, base intermediate comprising at least one compound selected from the group consisting of:
(a) adducts of the structure,

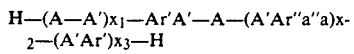

wherein $x_1$ is 0 or 1, $x_2$ is an integer of 0 to 8, $x_3$ is 0 or 1, A is a bivalent bis(N-terminated) amino group derived from said amine reactant and contains from 2 to 60 carbon atoms and from 2 to 11 nitrogen atoms, A' comprises the group —CH(T") wherein T" is H or alkyl of from 1 to 9 carbon atoms and is derived from the said aldehyde reactant, and Ar' comprises the moiety;

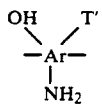

wherein Ar represents

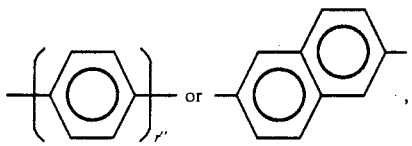

and wherein r" is 1 or 2, and derivatives thereof wherein from 1 to 3 ring carbon atoms are each substituted by an alkyl group or halogen atom, wherein T' is H, alkyl of 1 to 3 carbons or halogen, and (b) adducts of the structure:

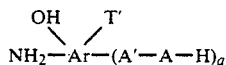

wherein T', A', Ar and A are as defined above, and "a" is an integer of 1 to 2; and said amido-amine and thioamido-amine reactant comprising a reaction product of at least one polyamine and an alpha, beta-unsaturated compound of the formula:

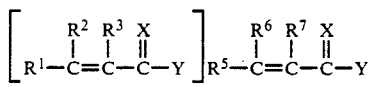

wherein X is sulfur or oxygen, Y is —OR$^8$, —SR$^8$ or —NR$^8$(R$^9$), wherein R$^5$, R$^6$, R$^7$, R$^8$ and R$^9$ are the same or different and are hydrogen or substituted or unsubstituted hydrocarbyl; and (ii) contacting said N-hydroxyalkyl amine-containing Mannich base intermediate with (a) at least one polymer substituted mono- or dicarboxylic acid material comprising polymer substituted with C$_4$ to C$_{10}$ monounsaturated dicarboxylic acid producing moieties or C$_3$ to C$_{10}$ monounsaturated monocarboxylic acid moieties, wherein said polymer has a number average molecular weight of from about 300 to 10,000, for a time and under conditions sufficient to form said Mannich Base condensation dispersant product.

36. The dispersant adduct of claim 35 wherein said polymer comprises polybutylene.

37. The dispersant adduct of claim 35 wherein said polymer has a number average molecular weight of from about 700 to about 5,000.

38. The dispersant adduct of claim 37 wherein said polymer comprises polyisobutylene and said number average molecular weight is between about 1,300 and 3,000.

39. The dispersant adduct of claim 36 wherein said hydrocarbyl substituted C$_4$ to C$_{10}$ monounsaturated dicarboxylic acid producing material comprises polyisobutylene of about 900 to 4000 number average molecular weight substituted with succinic anhydride moieties, said polyamine comprises polyalkylenepolyamine wherein each said alkylene group contain 2 to 6 carbons and said polyalkylenepolyamine contains 5 to 9 nitrogen atoms per molecule, and said alpha, beta-unsaturated compound comprises at least one member selected from the group consisting of methyl acrylate, ethyl acrylate, propyl acrylate, butyl acrylate, methyl methacrylate, ethyl methacrylate, propyl methacrylate, and butyl methacrylate.

40. The dispersant adduct according to claim 39 wherein said amine comprises an amido-amine.

41. The dispersant adduct according to claim 40 wherein the Ar group is phenyl and T' is H or alkyl of 1 to 3 carbon atoms.

42. The dispersant adduct according to claim 41 wherein said N-hydroxyaryl amine compound comprises 4-aminophenol.

* * * * *